(12) United States Patent
Mertins

(10) Patent No.: US 12,498,143 B2
(45) Date of Patent: Dec. 16, 2025

(54) SOLAR ARRAY WITH SERVICE ROBOT THAT CAN TRAVEL BETWEEN SOLAR PANELS

(71) Applicant: FRENELL IP GmbH, Karlsruhe (DE)

(72) Inventor: Max Mertins, Freiburg (DE)

(73) Assignee: FRENELL IP GmbH, Karlsruhe (DE)

( * ) Notice: Subject to any disclaimer, the term of this patent is extended or adjusted under 35 U.S.C. 154(b) by 678 days.

(21) Appl. No.: 17/800,816

(22) PCT Filed: Jul. 26, 2021

(86) PCT No.: PCT/DE2021/100644
§ 371 (c)(1),
(2) Date: Aug. 18, 2022

(87) PCT Pub. No.: WO2022/022778
PCT Pub. Date: Feb. 3, 2022

(65) Prior Publication Data
US 2023/0078006 A1 Mar. 16, 2023

(30) Foreign Application Priority Data
Jul. 29, 2020 (DE) .................... 10 2020 120 030.7

(51) Int. Cl.
*B25J 11/00* (2006.01)
*F24S 40/20* (2018.01)
(Continued)

(52) U.S. Cl.
CPC ............. *F24S 40/20* (2018.05); *B25J 11/008* (2013.01); *H02S 40/10* (2014.12); *B08B 1/00* (2013.01)

(58) Field of Classification Search
CPC ........ H02S 40/10; B25J 11/008; Y02E 10/40; Y10S 901/01
(Continued)

(56) References Cited

U.S. PATENT DOCUMENTS 8,240,320 B2 8/2012 Mertins et al.
8,726,458 B1 5/2014 Mahr et al.
(Continued)

FOREIGN PATENT DOCUMENTS

CN 104539233 A 4/2015
CN 107968625 A 4/2018
(Continued)

OTHER PUBLICATIONS

International Search Report in PCT/DE2021/100644, dated Oct. 20, 2021.

*Primary Examiner* — James J Buckle, Jr.
(74) *Attorney, Agent, or Firm* — Collard & Roe, P.C.

(57) ABSTRACT

A travel path is arranged on the end faces of the solar panels and on which a service robot can travel, can rotate in place by a suitable rotational device, and can continue on a line. In this manner, the service robot can travel completely autonomously. For each row of adjacent solar panels, a centering opening is paired with the travel path, wherein the service robot has a centering pin which can engage into the centering opening, or the travel path is made of multiple sub-surfaces which form a respective rotary table in the region of the end faces of the solar panels, and the rotary table can be rotated about a perpendicular rotational axis running through the rotary table.

13 Claims, 3 Drawing Sheets

Figure 1:
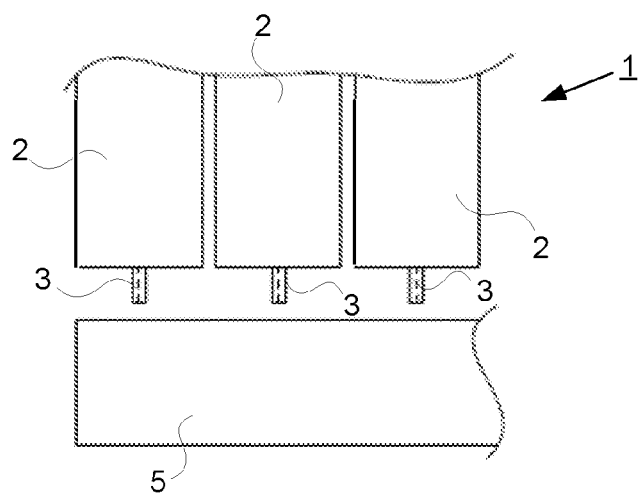

(51) Int. Cl.
  *H02S 40/10* (2014.01)
  *B08B 1/00* (2006.01)
(58) Field of Classification Search
  USPC ........................................................ 52/173.3
  See application file for complete search history.

(56) References Cited

U.S. PATENT DOCUMENTS

| | | | | |
|---|---|---|---|---|
| 9,020,636 | B2* | 4/2015 | Tadayon | B25J 5/02 |
| | | | | 901/1 |
| 9,506,783 | B2* | 11/2016 | Fukuba | H02S 50/00 |
| 9,882,067 | B2* | 1/2018 | Britcher | H02S 20/00 |
| 9,991,841 | B2* | 6/2018 | Castellucci | F24S 30/425 |
| 11,201,586 | B2* | 12/2021 | Limbasiya | H02S 50/15 |
| 11,638,939 | B2* | 5/2023 | Hartman | B08B 7/02 |
| | | | | 700/108 |
| 11,726,497 | B2* | 8/2023 | Xu | F24S 40/20 |
| | | | | 701/25 |
| 12,116,206 | B2* | 10/2024 | Stadie | B65G 1/0464 |
| 2003/0066158 | A1 | 4/2003 | Porter et al. | |
| 2003/0078006 | A1 | 4/2003 | Mahany | |
| 2010/0206294 | A1* | 8/2010 | Blair | F24S 40/20 |
| | | | | 126/600 |
| 2011/0137458 | A1* | 6/2011 | Hisatani | B08B 3/024 |
| | | | | 901/1 |
| 2014/0109334 | A1 | 4/2014 | Saraf | |
| 2017/0194898 | A1 | 7/2017 | Meller et al. | |
| 2019/0009313 | A1 | 1/2019 | Choori | |
| 2019/0267936 | A1 | 8/2019 | Jensen et al. | |

FOREIGN PATENT DOCUMENTS

| | | |
|---|---|---|
| CN | 110882967 A | 3/2020 |
| DE | 27 38 666 A1 | 3/1979 |
| DE | 29 50 078 A1 | 6/1981 |
| DE | 10 2004 036 094 A1 | 2/2006 |
| DE | 10 2006 053 704 A1 | 5/2008 |
| EP | 2 559 956 A1 | 2/2013 |
| EP | 3 582 055 A1 | 12/2019 |
| FR | 3022360 A1 | 12/2015 |
| JP | 2015-144547 A | 8/2015 |
| KR | 10 157 9036 B1 | 12/2015 |
| WO | 2008058528 A1 | 5/2008 |
| WO | 2015/110121 A1 | 7/2015 |
| WO | 2022022778 A1 | 2/2022 |

* cited by examiner

SOLAR ARRAY WITH SERVICE ROBOT THAT CAN TRAVEL BETWEEN SOLAR PANELS

CROSS REFERENCE TO RELATED APPLICATIONS

This application is the National Stage of PCT/DE2021/100644 filed on Jul. 26, 2021, which claims priority under 35 U.S.C. § 119 of German Application No. 10 2020 120 030.7 filed on Jul. 29, 2020, the disclosure of which is incorporated by reference. The international application under PCT article 21(2) was not published in English.

The present invention relates to a solar array comprising a plurality of solar panels that are set up in rows and can pivot about a pivot axle, as well as at least one service robot that can travel on the solar panels using drive elements, wherein the end faces of multiple solar panels are connected by way of a travel path that borders on them, for travel of the service robot between multiple rows of solar panels, and means of rotation for rotating the service robot about a perpendicular rotational axis that runs within the same are provided.

Such a solar array is already previously known from JP 2015 144 547 A. A service robot described there travels above the solar panels by way of bridges, in each instance, from row to row, wherein the travel of the service robot can take place freely in all directions. This merely requires a slight incline of the solar panels that are fixed in place there, so that the service robot cannot slip off.

Furthermore, reference should be made to EP 3 582 055 A1 and KR 10 157 9036 B1.

A special service robot in the form of a washing robot for a solar array is already previously known from DE 10 2006 053 704 A1. Such a washing robot serves for cleaning the mirror surfaces in a Fresnel solar power plant, which concentrate incident sunlight onto a central absorber that is located in a higher location. The purpose of such a washing robot primarily consists of keeping the mirror surfaces clean, so as to keep the energy yield of the power plant high. In this regard the robot engages around the edges of the individual solar panels, so that they do not have to be moved out of the inclined position. However, it is therefore also necessary to thread the robot off at the end of each row and to then thread it on again in another row, so as to clean an entire solar array little by little.

A further washing robot is evident from DE 10 2014 100 906 A1, the power supply of which takes place by way of the support structure of the solar panels, so that the robots do not have to be moved using an internal combustion engine or using battery operation, but can nevertheless move autarchically.

In general, it is usual to transfer service robots between the solar module rows by hand. Transfer can be eliminated, at most, if a fixed installation or a rail design is used.

Thus, for example, DE 27 38 666 A1 provides for a rail-based cleaning unit that is set up next to the solar panels. After the solar panels have been moved into a cleaning position, the apparatus can be moved over them and can clean the parabolic trough used here.

The situation is similar in DE 10 2004 036 094 A1, in which a special cleaning position also has to be approached in order to clean the parabolic trough shown there. Cleaning then takes place by means of a washing carriage that is moved on a rail system that is arranged around all the rows of the solar array.

The apparatus shown in US 2003/066158 A1 does, once again, travel directly on the solar panels, but must be held for this purpose, since no side guide exists. However, this is a manual cleaning method, as a whole.

DE 29 50 078 A1 proceeds from the assumption, in the case of multiple rows, that the solution shown there is structured multiple times, correspondingly, in order to reach all the rows. Only the water supply of the individual rows takes place in a centralized manner, so that a common pipeline system can be used for multiple rows.

All of these solutions either require manual interventions or a comprehensive rail construction or multiple embodiments of the cleaning apparatus.

Against this background, the present invention is based on the task of creating a solar array with a service robot that not only can service, in particular clean entire rows of the solar array autonomously, but rather also can autonomously change between rows of the solar array and thereby can service the entire solar array without intervention from the outside.

This task is accomplished by means of a solar array having the characteristics of the independent claim 1, as well as in accordance with the characteristics of the also independent claim 5. Practical embodiments of such a solar array can be derived from the dependent claims that follow them, in each instance.

According to the invention, it is provided that a solar array is built up of multiple rows of solar panels. In this regard, the solar panels can be both mirrors of a Fresnel power plant and photovoltaic solar panels. In order to keep the energy yield of these solar panels at as high a level as possible, it is practical to keep them clean. This is done using a service robot that can be structured as a washing robot. Consequently it is possible to equip the service robot with photosensors, in the sense of a maintenance robot, so as to determine correct the positioning of the solar panels it travels on and to compare this with the actual situation. Further applications are also conceivable.

In order to make the transition from one solar panel to the next possible, the invention provides for a travel path that is set up adjacent to the end faces of multiple solar panels, in such a manner that the travel path leads from one row of solar panels to the next. Preferably the rows of solar panels are set up parallel and flush, so that the travel path can run at a right angle to the rows of solar panels. When the service robot reaches the end face on a row of solar panels, it travels beyond the surface of the solar panel and in this way gets onto the travel path. Here the service robot performs a rotation by 90° and travels along the travel path to the next row of solar panels. After a further rotation by 90°, the service robot travels toward the next row of solar panels, leaves the travel path when doing so, and in this way gets back onto the solar panels to be cleaned or to be serviced. In order to be able to rotate on the travel path, in a tight space, it is necessary that means of rotation for rotating the service robot are present, which allow rotation about a rotational axis that is perpendicular with reference to the service robot and runs within the service robot. Particularly preferably it should be possible to rotate the service robot entirely in place, without moving in any direction.

In a first solution, this can be done by way of the drive means that are assigned to the service robot. If these can be operated to run in opposite directions, rotation of the service robot on its own power can take place directly in situ. In particular this is possible if the drive elements are drive wheels, drive rollers or drive belts, which contact the surface of the solar panels directly. Such drive elements can, in particular, have a slip-proof surface, which guarantees reliable advancing on the solar panel.

Usually the solar panels are already spaced slightly apart from one another, so that the drive elements must be distributed over a length, so that the service robot in turn can overcome the distance between two solar panels without external intervention. Accordingly, the same requirement also occurs with regard to possible distances between the end face of the solar panels and the travel path.

The travel path as such can also be structured in different ways. Thus a first, simplest form can be seen in a continuous travel path that can be implemented in the form of a single rotary table that runs past the end faces of the solar panels. The service robot rotates on such a rotary table under its own power and also enters and leaves it under its own power.

However, in a further embodiment the travel path can be configured as an interrupted surface. Then it is possible to position a rotary table following every end face of a solar panel, on which the service robot can preferably perform its turning maneuver. This can be done, for one thing, in that the rotary table as such is turned as a whole, so that the service robot performs its rotation along with it, and therefore does not necessarily have to be steerable itself. Alternatively, however, automatic rotation of the service robot under its own power can be promoted on such a rotary table.

In particular, such a configuration is advantageous if the service robot has side guide elements that are positioned at the corners of the rotary table, so that these do not bump up against the corners during a rotation about a rotational axis that runs within the service robot. When moving onto the next solar panel, the side guide elements then engage around the edges of the solar panel again and secure the service robot to prevent it from falling off to the side, even if the solar panels are brought back into a slanted position after it moves onto them.

In order to ensure that the service robot moves forward on the travel path until it reaches the correct positioning, and that the rotation is also carried out precisely, a centering opening can be assigned to the rotary tables—or also to a continuous travel table—at the height of the center parallels of the solar panels, in each instance. The service robot can move a centering pin on the underside into this opening, which pin engages into the centering opening when it moves over it, and holds the service robot centered above the rotary table or the centering opening during the rotation.

It can be necessary that at least the first solar panel, which borders on the travel path, must be brought into a position parallel to the travel path and thereby moved out of the operating position. Fundamentally, however, the solar panels that have been traveled on can return to the operating position, so that the side guide elements that have already been mentioned can be used. These hold the service robot on the solar panels and prevent the service robot from slipping off the solar panel.

If no rotary table is used, it is practical to structure the side guide elements in such a manner that they can be moved out of engagement with the edges of the solar panels. This can take place by means of retraction into the interior of a housing of the service robot, or also by means of flipping them up. As a result, the side guide elements do not hinder movement during the rotation on the travel path.

If, in contrast, a rotary table is used, then the side guide elements can be structured in the form of precisely four rollers that enclose a square between them that corresponds to the surface area of the rotary table. The rollers can then lie on the angle bisectors outside of the corners, so that during rotation about the center of the rotary table the side guide rollers do not bump up against the edges of the rotary table. If, in addition, there is a centering opening in the middle of the square rotary table, then precise rotation of the service robot about its centering bolt that moves into the centering opening can take place, even without having to bring the side guide rollers out of engagement.

The invention described above will be explained in greater detail in the following, using an exemplary embodiment.

Figure 2:
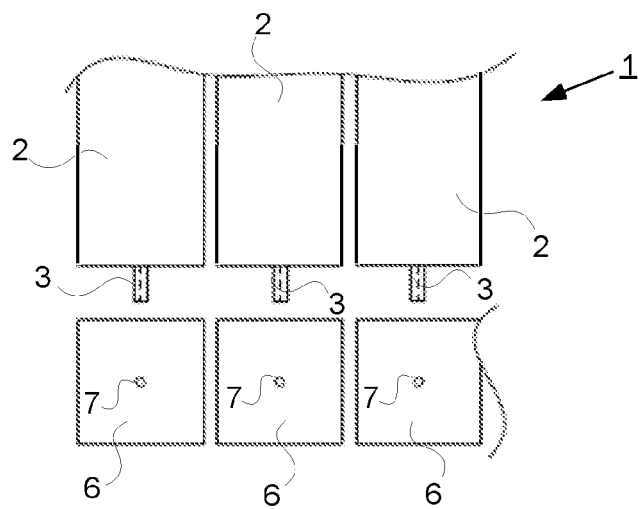
Figure 3:
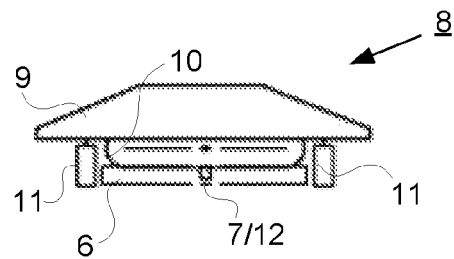
Figure 4:
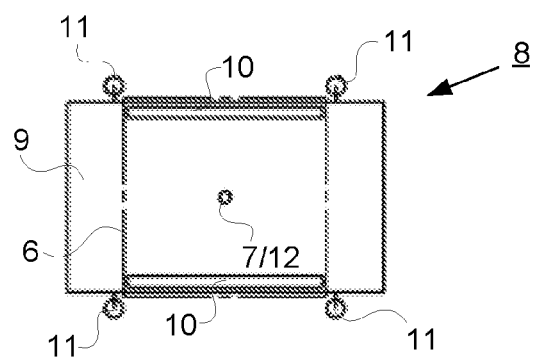
Figure 5:
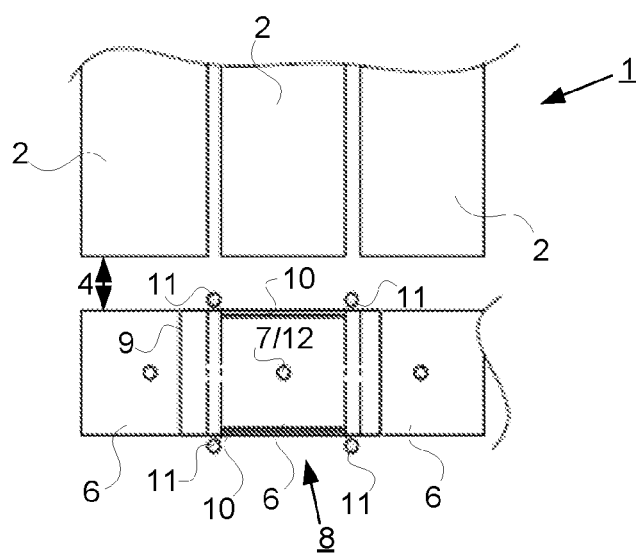

The figures show:

FIG. 1 the region of a continuous travel table of a solar array having at least three solar panels, in a schematic top view, FIG. 2 the region of the solar array according to FIG. 1, wherein the travel path is formed from multiple adjacent rotary tables, in a schematic top view, FIG. 3 a service robot on a rotary table in a schematic lateral top view, FIG. 4 the service robot according to FIG. 3 in a schematic top view from above, as well as FIG. 5 the region of the solar array according to FIG. 2, with the service robot according to FIG. 4, in a schematic top view from above.

FIG. 1 shows a region of a solar array 1 in a schematic top view. The solar array 1 consists of a plurality of solar panels 2, which can be both photovoltaic modules and mirrors, the latter of which can be oriented, row by row, toward a centrally set-up absorber. In both cases the solar panels 2 can pivot about a pivot axle 3, so that correct orientation with respect to the sun can take place. In order to keep the energy yield of the solar panels at the highest possible level, a service robot 8 can be used to clean the solar panels 2. This robot can be set onto a solar panel 2 and can move along its length. However, in order to also reach further rows of solar panels autonomously, a travel path is provided that connects the end faces of the different solar panels 2 with one another. This path is configured as a continuous travel table 5, onto which the service robot 8 travels at the end of a row of solar panels 2. As soon as the service robot 8 has reached the middle of the travel table 5, it will operate its two drive belts 10, which are arranged on the side, in opposite directions, so that rotation in place occurs. At 90° the service robot 8 ends the rotation and travels along the travel table 5 until it has reached the height of the center of the next row of solar panels 2. There it performs a further rotation by 90° in the same direction, and then travels forward onto and over the next row of solar panels 2.

FIG. 2 shows a variant of the solar array according to FIG. 1, in which the travel path is formed by multiple discrete rotary tables 6. In this regard, the rotary tables 6 each have a centering opening 7, which the service robot 8 can use as a stopping point for its rotation when it moves over the opening. Furthermore the rotary tables 6, which now jointly form the travel path, are spaced apart from one another, in each instance, so that side guide rollers 11 of the service robot 8 can remain in engagement while the robot performs its rotations on the rotary tables 6.

FIGS. 3 and 4 show the service robot 8 in a representation from the side, as well as a top view. Under its housing 9, the service robot 8 has a drive that consists of two drive belts composed of a slip-resistant material such as rubber or silicone, arranged lengthwise under the housing. In the case of movement of the drive belts in the same direction, forward movement of the service robot 8 takes place; in contrast, in the case of movement in opposite directions rotation about a rotational axis of the robot takes place.

Movement in the same direction but at different speeds would lead to travel along a curve, but this is not planned for.

The representation shows the service robot 8 on a rotary table 6, wherein a centering pin 12 arranged under the housing 9 has moved into the centering opening 7 of the rotary table 6 that has already been mentioned. Independent of how precisely the drive belts can be operated or whether one of them might sometimes slip, in this manner rotation can only take place about the rotational axis that is predetermined by the centering pin 12. The side guide rollers 11 that create a suitable side hold for the service robot 8 on its travel along the solar panels lie farther away from the centering pin 12 than the corners of the rotary table 6, so that during a rotation the side guide rollers 11 cannot bump into the rotary table 6 and prevent rotation. Therefore raising the side guide rollers 11 or folding them away can be eliminated.

This is illustrated once again in FIG. 5. Here the service robot 8 has just arrived onto the middle rotary table 6 and now moves the centering pin 12 into the centering opening 7 of the rotary table 6. Afterward the service robot 8 is moved about the rotational axis of the centering pin 12 by means of movement of the drive belts 10 in opposite directions, and positioned onto the middle solar panel 2 in the direction of travel. The centering pin 12 is then retracted again and the drive belts 10 are put into motion in the same direction, so that the service robot 8 is moved in the direction of the middle solar panel 2. First the distance 4 between the middle rotary table 6 and the middle solar panel 2 is overcome on the basis of the sufficient length of the drive belts 10, wherein the side guide rollers 11 that are at the front in the direction of travel engage first around the edges of the middle solar panel 2. The service robot 8 pushes itself onto the middle solar panel 2 until the drive belts 10 finally engage entirely onto the surface of the solar panel 2, and the side guide rollers 11 that are in the back in the travel direction also engage around the edges of the solar panel 2.

What has been described above is therefore a solar array with a service robot that can not only maintain entire rows of the solar array autonomously, but rather can also switch between the rows of the solar array autonomously and thereby can maintain the entire solar array without outside intervention.

REFERENCE SYMBOL LIST 1 solar array
2 solar panel
3 pivot axle
4 distance
5 travel table
6 rotary table
7 centering opening
8 service robot
9 housing
10 drive belt
11 side guide roller
12 centering pin

The invention claimed is:

1. A solar array comprising a plurality of solar panels that are set up in rows and can pivot about a pivot axle, as well as at least one service robot that can travel on the solar panels using drive elements,
wherein end faces of multiple solar panels are connected by way of a travel path that borders on the end faces, for travel of the service robot between multiple rows of solar panels, and means of rotation for rotating the service robot about a perpendicular rotational axis that runs within the service robot are provided,
wherein a centering opening located in a center of the travel path and in the rotational axis is assigned to the travel path for each row of adjacent solar panels, and
wherein the service robot has a centering pin arranged centrally in the service robot and in the rotational axis that can be moved into the centering opening and retracted from an underside of the travel path.

2. The solar array according to claim 1, wherein the travel path is formed from multiple sub-surfaces that form a rotary table in the region of the end faces of the solar panels, in each instance.

3. The solar array according to claim 2, wherein the rotary table can rotate about a perpendicular rotational axis that runs through the rotary table.

4. The solar array according to claim 2, wherein at least one travel table is arranged between two rotary tables.

5. The solar array according to claim 1, wherein the means of rotation comprise drive elements of the service robot that can be operated in opposite directions.

6. The solar array according to claim 5, wherein the drive elements of the service robot that can be operated in opposite directions are drive wheels, drive rollers or drive belts, which directly contact the surfaces of the solar panels.

7. The solar array according to claim 1, wherein the drive elements of the service robot are distributed over a length of the service robot that is both greater than the distance between two solar panels arranged in a row and also greater than the distance between the end face of a solar panel and the travel path.

8. The solar array according to claim 1, wherein the travel path is formed as a continuous travel table.

9. The solar array according to claim 1, wherein the service robot has side guide elements assigned to the service robot on both sides, for contacting longitudinal edges of the solar panels on both sides.

10. The solar array according to claim 9, wherein the side guide elements can be moved out of engagement with the longitudinal edges of the solar panels.

11. The solar array according to claim 9, wherein the side guide elements are four side guide rollers which are arranged so as to rotate around a perpendicular rotational axis and in such a manner that they are distributed uniformly around the service robot, and all have an identical distance from the centering pin, for introduction into the centering opening of a rotary table of the travel path.

12. A solar array comprising a plurality of solar panels that are set up in rows and can pivot about a pivot axle, as well as at least one service robot (8) that can travel on the solar panels using drive elements,
wherein end faces of multiple solar panels are connected by way of a travel path that borders on the end faces, for travel of the service robot between multiple rows of solar panels, and means of rotation for rotating the service robot about a perpendicular rotational axis that runs within the service robot are provided,
wherein the travel path is formed by multiple sub-surfaces that form a rotary table in the region of the end faces of the solar panels, in each instance, and the rotary table can rotate about a perpendicular rotational axis that runs through the rotary table,
wherein a centering opening located in a center of the rotary table and in the rotational axis is assigned to the travel path for each row of adjacent solar panels, and
wherein the service robot has a centering pin arranged centrally in the service robot and in the rotational axis that can be moved into the centering opening and retracted from an underside of the rotary table.

13. The solar array according to claim 12, wherein at least one travel table is arranged between two rotary tables.

* * * * *